US011246093B2

United States Patent
Yu

(10) Patent No.: US 11,246,093 B2
(45) Date of Patent: Feb. 8, 2022

(54) METHOD AND APPARATUS FOR THERMAL MANAGEMENT IN WIRELESS COMMUNICATION

(71) Applicant: Samsung Electronics Co., Ltd., Suwon-si (KR)

(72) Inventor: Hyunseok Yu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/838,453

(22) Filed: Apr. 2, 2020

(65) Prior Publication Data

US 2020/0329431 A1 Oct. 15, 2020

(30) Foreign Application Priority Data

Apr. 12, 2019 (KR) .................. 10-2019-0043297
Jul. 23, 2019 (KR) .................. 10-2019-0089208

(51) Int. Cl.
*H04M 3/00* (2006.01)
*H04W 52/02* (2009.01)
*H04M 1/02* (2006.01)

(52) U.S. Cl.
CPC ..... *H04W 52/0225* (2013.01); *H04M 1/0279* (2013.01)

(58) Field of Classification Search
CPC ................ H04W 52/0225; H04M 1/0279
USPC .......................................... 455/418
See application file for complete search history.

(56) References Cited

U.S. PATENT DOCUMENTS

| 7,050,765 B2 | 5/2006 | Ammar et al. |
| 7,860,018 B2 | 12/2010 | Raith |
| 8,620,235 B2 | 12/2013 | Riddle et al. |
| 9,019,880 B2 | 4/2015 | Ehsan et al. |
| 9,667,280 B2 | 5/2017 | Shahidi et al. |
| 9,742,486 B2 | 8/2017 | Cross |
| 10,218,422 B2 | 2/2019 | Raghavan et al. |
| 2012/0075992 A1* | 3/2012 | Shahidi ............. H04W 52/0251 370/235 |
| 2016/0305678 A1* | 10/2016 | Pavlovski ............. F24F 11/62 |
| 2018/0059769 A1* | 3/2018 | Sripathi ............. H04L 1/0053 |
| 2018/0199185 A1* | 7/2018 | Tenny ............. H04W 8/22 |
| 2019/0094929 A1 | 3/2019 | Geekie et al. |

FOREIGN PATENT DOCUMENTS

| JP | 5728033 B2 | 6/2015 |
| JP | 2018205218 A | 12/2018 |

* cited by examiner

*Primary Examiner* — Huy C Ho
(74) *Attorney, Agent, or Firm* — Harness, Dickey & Pierce, P.L.C.

(57) ABSTRACT

A signal processing device, which processes a baseband signal for wireless communication, includes a plurality of temperature sensors arranged to sense internal temperatures of the signal processing device, respectively, a threshold storage storing a plurality of thresholds, and a controller that estimates a surface temperature based on the sensed internal temperatures and performs a thermal mitigation operation based on the surface temperature and a plurality of temperature ranges defined by the plurality of thresholds.

19 Claims, 21 Drawing Sheets

● : Temperature Sensor

METHOD AND APPARATUS FOR THERMAL MANAGEMENT IN WIRELESS COMMUNICATION

CROSS-REFERENCE TO RELATED APPLICATION

This application claims the benefit of Korean Patent Application No. 10-2019-0043297, filed on Apr. 12, 2019, and Korean Patent Application No. 10-2019-0089208, filed on Jul. 23, 2019, in the Korean Intellectual Property Office, the disclosure of each of which is incorporated herein in its entirety by reference.

BACKGROUND

Example embodiments of the inventive concepts relate to wireless communication. For example, at least some example embodiments relate to a method and apparatus for thermal management in wireless communication.

Due to the high throughput of a wireless communication system and the high complexity of signal processing, high signal processing capability may be utilized for a wireless communication device. Continued use of high signal processing capability may result in high power consumption and heat generation in the wireless communication device, and may significantly increase the temperature of the wireless communication device, especially when massive data transmission is maintained. Heat generated by performing high complexity and speed signal processing may not only cause malfunction of the wireless communication device but also damage to components included in the wireless communication device. In addition, in a wireless communication device possessed by a user, such as a mobile phone, heat generation may cause the user discomfort and may be harmful to the user's body. Therefore, thermal management in the wireless communication device may be critical.

SUMMARY

Example embodiments of inventive concepts provide a method and/or apparatus for more practical thermal management by estimating surface temperature to manage heat generation in a wireless communication device.

According to an example embodiment of the inventive concepts, there is provided a signal processing device, which processes a baseband signal for wireless communication, the signal processing device including a plurality of temperature sensors configured to sense a plurality of internal temperatures of the signal processing device, respectively; a storage device configured to store a plurality of thresholds defining a plurality of temperature ranges; and a controller configured to, estimate a surface temperature based on the plurality of internal temperatures, and selectively perform at least one thermal mitigation operation based on the surface temperature and the plurality of temperature ranges.

According to an example embodiment of the inventive concepts, there is provided a wireless communication device including a temperature sensing device configured to sense a first temperature; a main processor configured to obtain the first temperature; a signal processing device communicatively connected with the main processor, the signal processing device configured to, process a baseband signal for wireless communication, and perform a thermal management operation by, obtaining the first temperature from the main processor, estimate a surface temperature of the wireless communication device based on a plurality of second temperatures sensed internally and the first temperature, and selectively perform a thermal mitigation operation based on the surface temperature and a plurality of temperature ranges defined by a plurality of thresholds.

According to an example embodiment of the inventive concepts, there is provided a thermal management method performed by a signal processing device configured to process a baseband signal for wireless communication, the thermal management method including sensing a plurality of internal temperatures of the signal processing device; estimating a surface temperature based on the plurality of internal temperatures; reading, from a storage device, a plurality of thresholds defining a plurality of temperature ranges; and performing at least one thermal mitigation operation based on the surface temperature and the plurality of temperature ranges.

According to an example embodiment of the inventive concepts, there is provided a signal processing device processing a baseband signal for wireless communication, the signal processing device including a plurality of temperature sensors configured to sense a plurality of internal temperatures of the signal processing device, respectively; a storage device configured to store a plurality of thresholds; and processing circuitry configured to transition between a plurality of states in a state machine based on a surface temperature, the surface temperature being estimated based on the plurality of internal temperatures such that the state machine is configured to, transition to a first state in response to the surface temperature being less than or equal to a second threshold higher than a first threshold, the first state being a state in which signal processing is performed; transition to a second state in response to the surface temperature being above the second threshold, the second state being a state in which the signal processing is performed; transition to a third state in response to the surface temperature being a third threshold greater than the second threshold, the third state being a state in which the signal processing is adjusted and performed; and transition to a fourth state in response to the surface temperature being above a fourth threshold greater than the third threshold, the fourth state being a state in which the signal processing is limited.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
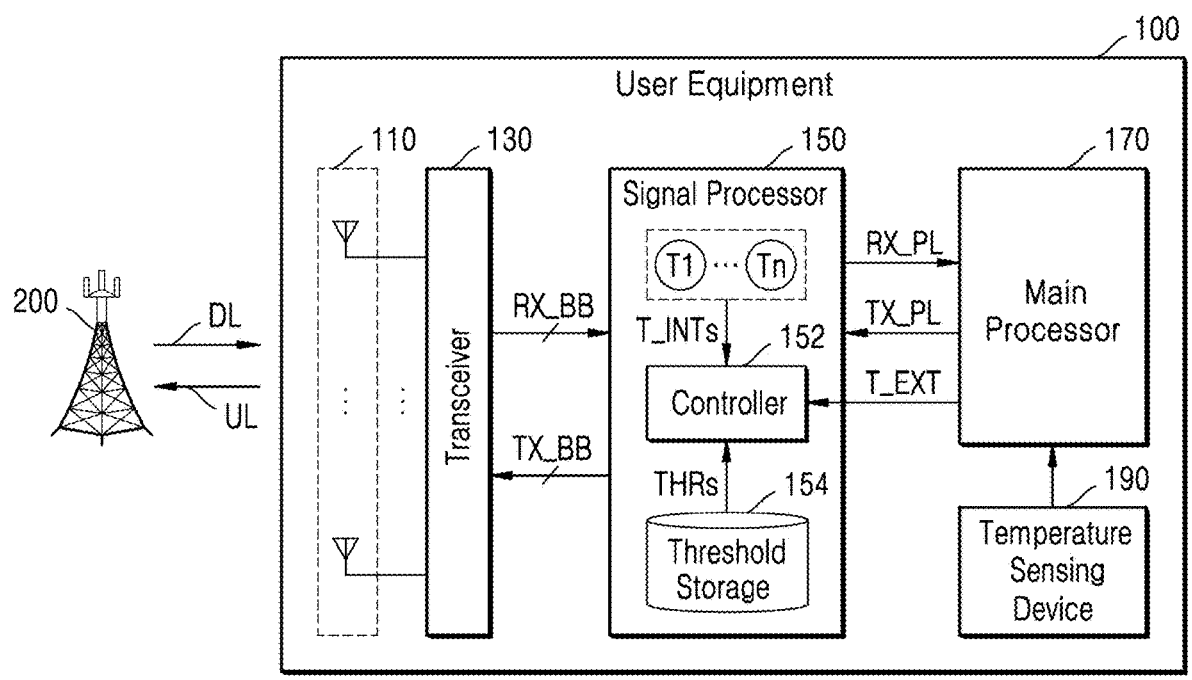
FIG. 1 is a block diagram of a wireless communication system including a wireless communication device according to an example embodiment of the inventive concepts.

FIG. 1 is a block diagram of a wireless communication system 10 including a wireless communication device according to an example embodiment of the inventive concepts.

Referring to FIG. 1, the wireless communication system 10 may be, as a non-limiting example, a wireless communication system using a cellular network such as a 5th generation wireless (5G) system, a long term evolution (LTE) system, an LTE-advanced system, a code division multiple access (CDMA) system, or a global system for mobile communications (GSM), or may be a wireless personal area network (WPAN) system or any other wireless communication system. Hereinafter, the wireless communication system will be described mainly with reference to a wireless communication system using a cellular network, but it will be understood that embodiments of the inventive concepts are not limited thereto.

A wireless communication network between user equipment 100 and a base station 200 may support communication between multiple users by sharing available network resources. For example, in the wireless communication network, information may be transmitted in various multiple access schemes, such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. As shown in FIG. 1, the user equipment 100 may communicate with the base station 200 through an uplink UL and a downlink DL. In some example embodiments, pieces of user equipments may communicate with each other through a sidelink, such as device-to-device (D2D). In the present specification, each of the user equipment 100 and the base station 200 may be referred to as a wireless communication device.

The base station 200 may generally refer to a fixed station that communicates with user equipment and/or other base stations, and may exchange data and control information by communicating with user equipment and/or other base stations. For example, the base station 200 may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

The user equipment 100 may be fixed or mobile and may refer to any device that may communicate with a base station, such as the base station 200, to transmit and receive data and/or control information. For example, the user equipment 100 may be referred to as a terminal, a terminal equipment, a mobile station (MS), a mobile terminal (MT), a user terminal (UT), a subscriber station (SS), a wireless device, a handheld device, or the like. Hereinafter, embodiments of the inventive concepts will be described mainly with reference to the user equipment 100 as a wireless communication device, but it will be understood that the embodiments of the inventive concepts may also be applied to the base station 200.

As shown in FIG. 1, the user equipment 100 may include a plurality of antennas 110, a transceiver 130, a signal processor 150, a main processor 170, and a temperature sensing device 190. In some example embodiments, at least two of the plurality of antennas 110, the transceiver 130, the signal processor 150, and the main processor 170 may be included in one semiconductor package.

The plurality of antennas 110 may receive a signal from the base station 200 in a reception mode or output a signal provided from the transceiver 130 in a transmission mode. In some example embodiments, the user equipment 100 may include a plurality of antennas for at least one of spatial diversity, polarization diversity, spatial multiplexer, and beamforming. For example, at least some of the plurality of antennas 110 may support multiple-input and multiple-output (MIMO). In some example embodiments, the plurality of antennas 110 may include two or more sub-arrays, each of which may be referred to as a phased array.

The transceiver 130 may be connected to the plurality of antennas 110. The transceiver 130 may generate a receive baseband signal RX_BB by processing radio frequency (RF) signals received from the plurality of antennas 110 in the reception mode and may provide RF signals to the plurality of antennas 110 by processing a transmit baseband signal TX_BB in the transmission mode. For example, the transceiver 130 may include a filter, a mixer, a power amplifier, a low noise amplifier, and the like. In some example embodiments, in order to support MIMO, the transceiver 130 may provide the receive baseband signal RX_BB to the signal processor 150 via a plurality of paths in the reception mode and may receive the transmit baseband signal TX_BB from the signal processor 150 via a plurality of paths in the transmit mode.

The signal processor 150 may receive the receive baseband signal RX_BB from the transceiver 130 and may provide the transmit baseband signal TX_BB to the transceiver 130. As will be described below with reference to FIG. 3, the signal processor 150 may include functional blocks for generating a receive payload RX_PL from the receive baseband signal RX_BB and functional blocks for generating the transmit baseband signal TX_BB from a transmit payload TX_PL. The signal processor 150 may be referred to as a communication processor, a baseband processor, a modem, or a baseband modem, and may also be referred to herein as a signal processing device. As shown in FIG. 1, the signal processor 150 may include first to n-th temperature sensors T1 to Tn, a controller 152, and a threshold storage 154 (where n is an integer greater than 1).

The first to n-th temperature sensors T1 to Tn may sense internal temperatures of the signal processor 150. For example, as described below with reference to FIG. 3, at least one of the first to n-th temperature sensors T1 to Tn may be arranged in each of the functional blocks included in the signal processor 150. Accordingly, the first to n-th temperature sensors T1 to Tn may sense internal temperatures due to heat generation of the functional blocks and may output signals corresponding to the sensed internal temperatures. As shown in FIG. 1, internal temperatures T_INTs sensed by the first to n-th temperature sensors T1 to Tn may be provided to the controller 152. In the present specification, that the controller 152 obtains the internal temperatures T_INTs from signals provided by the first to n-th temperature sensors T1 to Tn may be simply stated as that the controller 152 obtains the internal temperatures T_INTs from the first to n-th temperature sensors T1 to Tn. Also, in the present specification, that the first to n-th temperature sensors T1 to Tn provide the controller 152 with a signal including information on the sensed internal temperatures T_INTs may be simply stated as that the first to n-th temperature sensors T1 to Tn provide the controller 152 with the internal temperatures T_INTs. The first to n-th temperature sensors T1 to Tn may sense the internal temperatures T_INTs in any manner. For example, each of the first to n-th temperature sensors T1 to Tn may include a thermistor and may output a signal having a characteristic, such as a frequency, varying according to temperature. In some example embodiments, in order to selectively (or sequentially) provide signals output by the first to n-th temperature sensors T1 to Tn to the controller 152, the signal processor 150 may further include a multiplexer between the first to n-th temperature sensors T1 to Tn and the controller 152.

The threshold storage 154 may store a plurality of thresholds. As described below, the plurality of thresholds may be compared with a surface temperature estimated by the controller 152 and may define two or more temperature ranges. In some example embodiments, the threshold storage 154 may include a nonvolatile memory, for a non-limiting example, a flash memory, electrically erasable programmable read only memory (EEPROM), resistive random access memory (RRAM), phase-change random access memory (PRAM), and the like. In some example embodiments, a plurality of thresholds may be stored in the threshold storage 154 in a process of manufacturing the signal processor 150. Furthermore, in some example embodiments, a plurality of thresholds may be stored in the threshold storage 154 in a process of manufacturing the user equipment 100. As shown in FIG. 1, the controller 152 may obtain a plurality of thresholds THRs from the threshold storage 154.

The controller 152 may estimate a surface temperature based on the internal temperatures T_INTs provided by the first to n-th temperature sensors T1 to Tn. In some example embodiments, the controller 152 may estimate the surface temperature of the signal processor 150 and/or the surface temperature of the user equipment 100 based on the internal temperatures T_INTs. In some example embodiments, the controller 152 may obtain an external temperature T_EXT of the signal processor 150 from the main processor 170 and may estimate the surface temperature of the equipment 100 based on the internal temperatures T_INTs and the external temperature T_EXT. The controller 152 may compare the estimated surface temperature with the plurality of thresholds THRs provided from the threshold storage 154 and may selectively perform a thermal mitigation operation according to a comparison result. Accordingly, more practical thermal management of the signal processor 150 or the user equipment 100 may be achieved by predicting a surface temperature, which is actually a problem due to the heat generation of the signal processor 150. In addition, the signal processor 150 may perform a thermal mitigation operation suitable for each of a plurality of temperature ranges, thereby achieving more efficient thermal management.

In some embodiment, the controller 152 may be implemented as logic hardware designed by logic synthesis, and in some example embodiments, the controller 152 may be implemented as a processing unit including at least one core and a memory that stores instructions executed by the at least one core. In some example embodiments, the controller 152 may be implemented as a combination of the logic hardware and the processing unit.

The main processor 170 may control the operation of the user equipment 100, may generate a transmit payload TX_PL including information to be provided to another party through wireless communication, and may receive a receive payload RX_PL including information provided from the other party through wireless communication.

In some example embodiments, the main processor 170 may include at least one core that executes software including an operating system (OS) and applications on the OS, and may be referred to as an application processor (AP).

The temperature sensing device 190 may sense an ambient temperature inside the user equipment 100 and may provide a signal indicating the sensed ambient temperature to the main processor 170. In some example embodiments, the temperature sensing device 190 may be arranged on a board on which the signal processor 150 and the main processor 170 are mounted. As a non-limiting example, the temperature sensing device 190 may include a thermistor. The main processor 170 may provide the controller 152 of the signal processor 150 with the ambient temperature sensed by the temperature sensing device 190, that is, the external temperature T_EXT of the signal processor 150. In some example embodiments, the external temperature T_EXT may be provided to the signal processor 150 from the main processor 170 by inter-processor communication (IPC).

Figure 2:
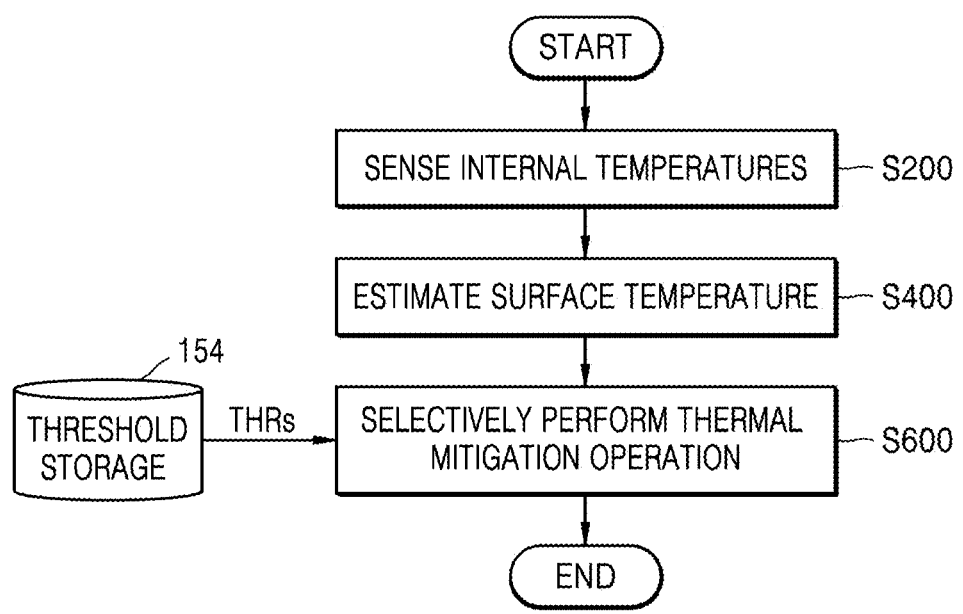
FIG. 2 is a flowchart illustrating a method for thermal management in wireless communication, according to an example embodiment of the inventive concepts.

FIG. 2 is a flowchart illustrating a method for thermal management in wireless communication, according to an example embodiment of the inventive concepts. In some example embodiments, the method of FIG. 2 may be performed by the signal processor 150 of FIG. 1, which will be described below with reference to FIG. 1.

Referring to FIG. 2, an operation of sensing internal temperatures may be performed in operation S200. For example, the first to n-th temperature sensors T1 to Tn included in the signal processor 150 may sense internal temperatures T_INTs of the signal processor 150 and may provide the sensed internal temperatures T_INTs to the controller 152.

In operation S400, an operation of estimating surface temperature may be performed. For example, the controller 152 may estimate the surface temperature of the signal processor 150 and/or the surface temperature of the user equipment 100 based on the internal temperatures T_INTs. The controller 152 may estimate the surface temperature of the user equipment 100 further based on the external temperature TEXT provided from the main processor 170. Examples of operation S400 will be described below with reference to FIGS. 5A to 5C, 6, and the like.

In operation S600, a thermal mitigation operation may be selectively performed. For example, the controller 152 may determine whether to perform a thermal mitigation operation based on the surface temperature estimated in operation S400 and the plurality of thresholds THRs provided from the threshold storage 154. In addition, when it is determined to perform the thermal mitigation operation, the controller 152 may select at least one of a plurality of operations for thermal mitigation and may trigger the selected operation. Examples of the plurality of thresholds THRs will be described below with reference to FIGS. 7 and 8, and examples of the thermal mitigation operation will be described below with reference to FIGS. 11 to 15.

Figure 3:
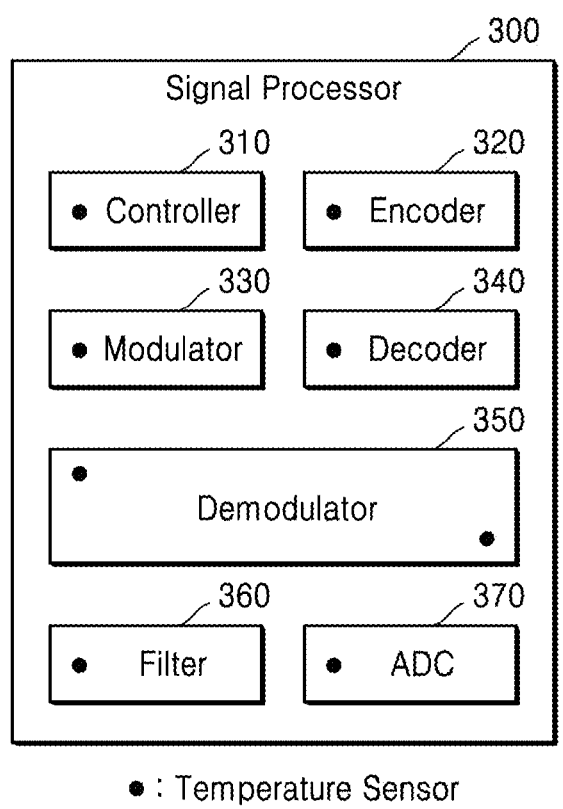
FIG. 3 is a block diagram of an example of a signal processor according to an example embodiment of the inventive concepts.

FIG. 3 is a block diagram of an example of a signal processor according to an example embodiment of the inventive concepts. Specifically, the block diagram of FIG. 3 shows an example of the arrangement of temperature sensors included in a signal processor 300. As described above with reference to FIG. 1, the signal processor 300 may include a plurality of temperature sensors for sensing internal temperatures T_INTs.

Referring to FIGS. 1 to 3, as described above with reference to FIG. 1, the signal processor 300 may include a plurality of functional blocks to process signals for wireless communication. For example, as shown in FIG. 3, the signal processor 300 may include a controller 310, an encoder 320, a modulator 330, a decoder 340, a demodulator 350, a filter 360, and an analog-to-digital converter 370. In some example embodiments, the signal processor 300 may further include functional blocks not shown in FIG. 3, such as a digital-to-analog converter (DAC). In this case, two or more functional blocks may be implemented as a single functional block. At least some of the functional blocks included in the signal processor 300 may be implemented as logic hardware or may be implemented as a processing unit.

In some example embodiments, at least one temperature sensor may be arranged in each of the functional blocks of the signal processor 300. For example, as indicated by ● in FIG. 3, one temperature sensor may be arranged in each of the controller 310, the encoder 320, the modulator 330, the decoder 340, the filter 360, and the analog-to-digital converter 370, whereas two temperature sensors may be arranged in the demodulator 350 that occupy a relatively large area. Accordingly, the temperature sensor may sense the temperature of a functional block on which the temperature sensor is placed.

Figure 4A:
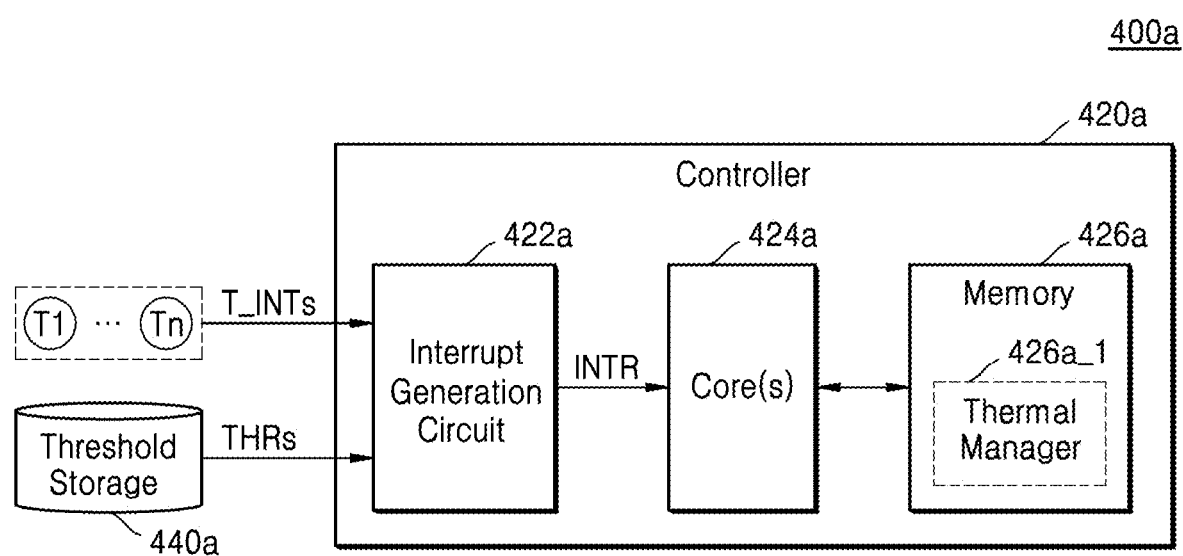
FIGS. 4A and 4B are block diagrams of examples of a signal processor according to example embodiments of the inventive concepts.
Figure 4B:
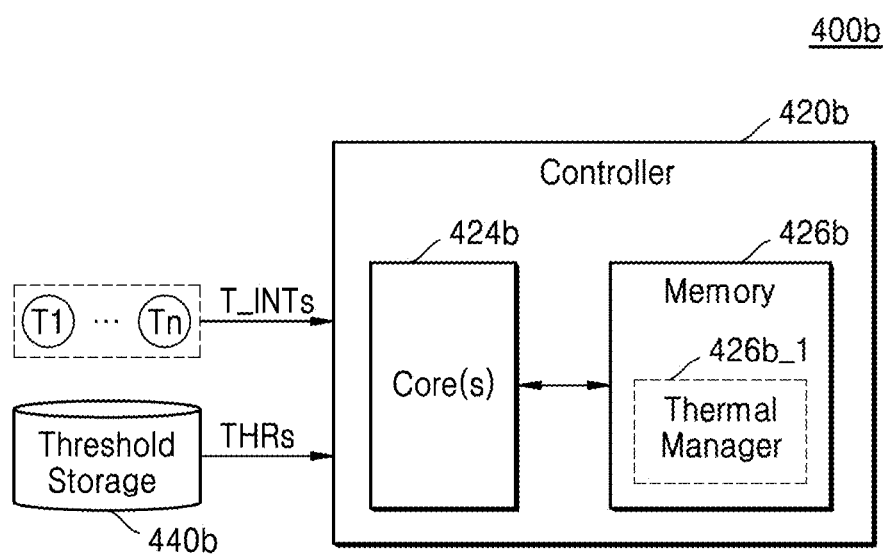

FIGS. 4A and 4B are block diagrams of examples of a signal processor according to example embodiments of the inventive concepts. Specifically, the block diagram of FIG. 4A shows a signal processor 400a for performing a method for thermal management based on an interrupt, and the block diagram of FIG. 4B shows a signal processor 400b for periodically performing a method for thermal management. Hereinafter, repeated descriptions of FIGS. 4A and 4B will be omitted.

Referring to FIG. 4A, the signal processor 400a may include first to n-th temperature sensors T1 to Tn, a controller 420a, and a threshold storage 440a (where n is an integer greater than 1). The first to n-th temperature sensors T1 to Tn may provide internal temperatures T_INTs to the controller 420a, and the threshold storage 440a may provide a plurality of thresholds THRs to the controller 420a.

The controller 420a may include an interrupt generation circuit 422a, at least one core 424a, and a memory 426a. The interrupt generation circuit 422a may generate an interrupt signal INTR that causes an interrupt of the at least one core 424a based on the internal temperatures T_INTs and the plurality of thresholds THRs. For example, the controller 420a may estimate surface temperature based on the internal temperatures T_INTs and may activate the interrupt signal INTR when variations in a thermal mitigation operation, for example, initiation, release, change, or addition of a thermal mitigation operation, are required, based on the estimated surface temperature and the plurality of thresholds THRs.

The at least one core 424a may execute a series of instructions stored in the memory 426a. For example, as shown in FIG. 4A, the memory 426a may store a thermal manager 426a_1 as a program (also referred to as a software module, a procedure, a subroutine, etc.) including a plurality of instructions. The at least one core 424a may perform an operation for thermal management by executing the thermal manager 426a_1. In the present specification, that the at least one core 424a performs an operation by executing the thermal manager 426a_1 may be simply stated as that the thermal manager 426a_1 performs the operation. In some example embodiments, differently from that shown in FIG. 4A, the memory 426a may be external to the controller 420a or may be external to the signal processor 400a.

When an activated interrupt signal INTR is received from the interrupt generation circuit 422a, the thermal manager 426a_1 may selectively perform a thermal mitigation operation. For example, the thermal manager 426a_1 may additionally obtain information on the estimated surface temperature and/or information on a temperature range including the surface temperature from the interrupt generation circuit 422a when an interrupt occurs, and may initiate, release, change, or add a thermal mitigation operation based on the obtained information. The memory 426a may include any type of memory accessible by the at least one core 424a, for example, random access memory (RAM), read only memory (ROM), tape, magnetic disk, optical disk, volatile memory, nonvolatile memory, and a combination thereof.

Referring to FIG. 4B, the signal processor 400b may include first to n-th temperature sensors T1 to Tn, a threshold storage 440b, and a controller 420b, and the controller 420b may include at least one core 424b and a memory 426b. The at least one core 424b may perform an operation for thermal management by executing a thermal manager 426b_1 stored in the memory 426b. In the example of FIG. 4B, the thermal manager 426b_1 may periodically perform a method for thermal management, for example, operations S400 and S600 of FIG. 2. In some example embodiments, a timer interrupt may occur periodically, and the thermal manager 426b_1 may perform operations S400 and S600 of FIG. 2 in response to the timer interrupt. In some example embodiments, the thermal manager 426b_1 may perform operations S400 and S600 of FIG. 2 by polling.

Figure 5A:
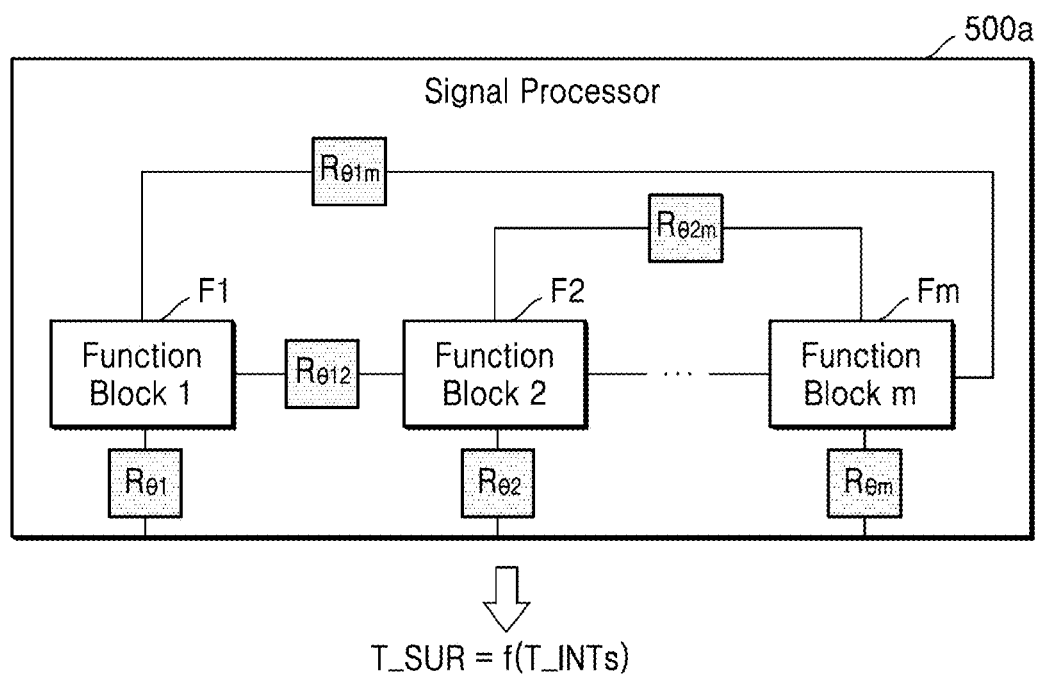
FIGS. 5A to 5C are block diagrams of examples of a signal processor according to example embodiments of the inventive concepts.
Figure 5B:
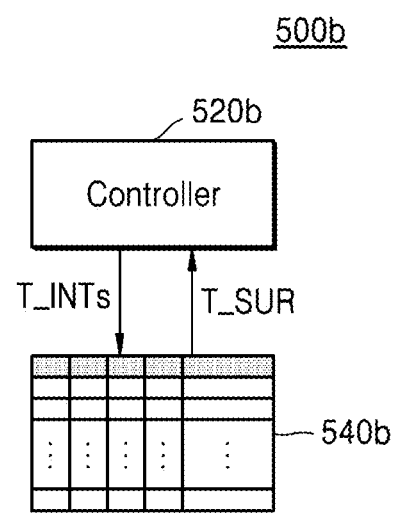
Figure 5C:
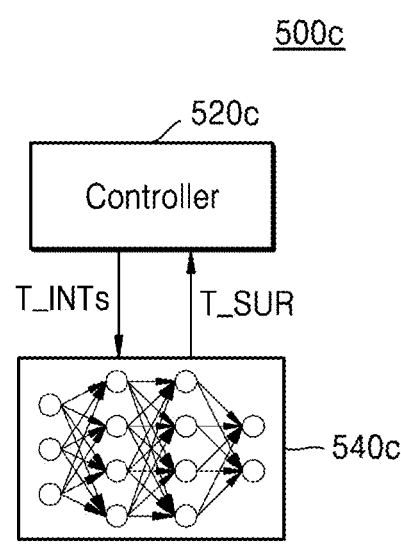

FIGS. 5A to 5C are block diagrams of examples of a signal processor according to example embodiments of the inventive concepts. Specifically, the block diagrams of FIGS. 5A to 5C show structures of a signal processor for estimating a surface temperature T_SUR from internal temperatures T_INTs. Hereinafter, repeated descriptions of FIGS. 5A to 5C will be omitted.

Referring to FIG. 5A, in some example embodiments, a surface temperature T_SUR may be estimated based on a predefined function f that takes internal temperatures T_INTs as arguments. For example, as shown in FIG. 5A, a signal processor 500a may include first to m-th functional blocks F1 to Fm, and at least one temperature sensor may be arranged in each of the first to m-th functional blocks F1 to Fm (where m is an integer greater than 1). The signal processor 500a may be modeled as a thermal resistance network including the first to m-th functional blocks F1 to Fm as heat sources. For example, as shown in FIG. 5A, the thermal resistance network may include thermal resistances $R_{\theta 1}$, $R_{\theta 2}$, ..., and $R_{\theta m}$ between the surface of the signal processor 500a and the first to m-th functional blocks F1 to Fm. In addition, the thermal resistance network may include thermal resistances $R_{\theta 12}$, $R_{\theta 1m}$, $R_{\theta 2m}$, and the like between the first to m-th functional blocks F1 to Fm. Accordingly, a function f for estimating the surface temperature T_SUR from the internal temperatures T_INTs may be defined based on the thermal resistance network. In some example embodiments, the function f may be stored in the memories 426a and 426b of FIGS. 4A and 4B.

Referring to FIG. 5B, in some example embodiments, a surface temperature T_SUR may be estimated based on a lookup table 540b that includes surface temperatures corresponding to combinations of internal temperatures T_INTs. For example, as shown in FIG. 5B, a signal processor 500b may include a controller 520b and a lookup table 540b, and the lookup table 540b may include surface temperatures corresponding to combinations of the internal temperatures T_INTs. The controller 520b may provide the internal temperatures T_INTs to the lookup table 540b and may obtain a surface temperature T_SUR corresponding to the internal temperatures T_INTs from the lookup table 540b. The lookup table 540b may be stored in a nonvolatile memory accessible by the controller 520b. In some example embodiments, the lookup table 540b may be stored in an external memory of the controller 520b, and may be stored in an internal memory of the controller 520b, such as the memories 426a and 426b of FIGS. 4A and 4B.

Referring to FIG. 5C, in some example embodiments, a controller 520c may include an artificial neural network 540c, which may be in a trained state according to training data including a plurality of combinations of internal temperatures T_INTs and a plurality of surface temperatures. The artificial neural network 540c may refer to a structure in which artificial neurons (or neuron models) implement interconnected sets. The artificial neurons may generate output data by performing simple operations on input data, and the output data may be transferred to other artificial neurons. The artificial neural network 540c may output a surface temperature T_SUR in response to the internal temperatures T_INTs provided by the controller 520c, and the controller 520c may obtain the surface temperature T_SUR provided by the artificial neural network 540c.

Figure 6:
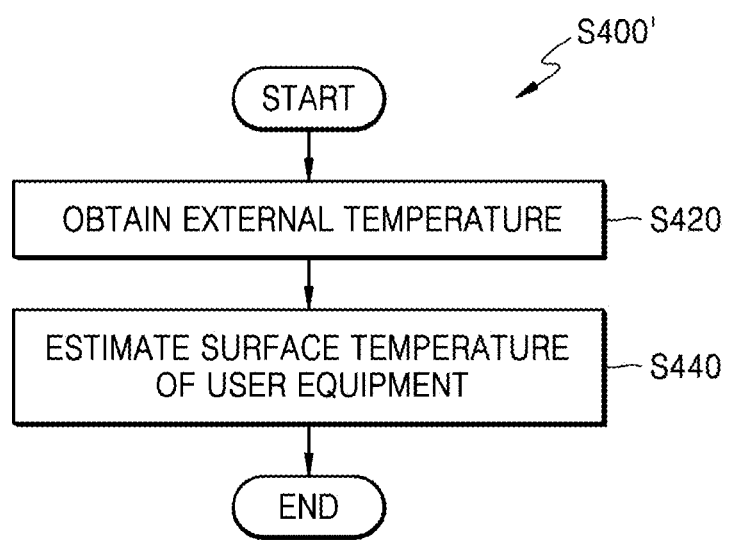
FIG. 6 is a flowchart illustrating a method for thermal management according to an example embodiment of the inventive concepts.

FIG. 6 is a flowchart illustrating a method for thermal management according to an example embodiment of the inventive concepts. Specifically, the flowchart of FIG. 6 shows an example of operation S400 of FIG. 2, and as described above with reference to FIG. 2, an operation of estimating surface temperature may be performed in operation S400' of FIG. 6. As shown in FIG. 6, operation S400' may include operation S420 and operation S440. In some example embodiments, operation S400' of FIG. 6 may be performed by the controller 152 of FIG. 1, and FIG. 6 will now be described with reference to FIG. 1.

Referring to FIG. 6, an operation of obtaining an external temperature TEXT may be performed in operation S420. For example, the controller 152 may obtain the external temperature TEXT from the main processor 170. As described above with reference to FIG. 1, the external temperature TEXT may correspond to an ambient temperature sensed by the temperature sensing device 190 arranged outside the signal processor 150, and the main processor 170 may provide the external temperature TEXT to the controller 152 according to an output signal of the temperature sensing device 190.

In operation S440, an operation of estimating the surface temperature of the user equipment 100 may be performed. For example, the controller 152 may estimate the surface temperature of the user equipment 100 based on not only the internal temperatures T_INTs, provided by the first to n-th temperature sensors T1 to Tn included in the signal processor 150, but also the external temperature TEXT obtained in operation S420. In some example embodiments, the controller 152 may model a thermal resistance network of the user equipment 100, similarly as described above with reference to FIG. 5A, and may estimate the surface temperature of the user equipment 100 based on a function predefined based on the thermal resistance network, the predefined function having the internal temperatures T_INTs and the external temperatures TEXT as arguments. In some example embodiments, the controller 152 may estimate the surface temperature of the user equipment 100 by referring to a lookup table including a plurality of combinations of the internal temperatures T_INTs and the external temperature TEXT and surface temperatures corresponding to the plurality of combinations, similarly as described above with reference to FIG. 5B. Furthermore, in some example embodiments, the controller 152 may estimate the surface temperature of the user equipment 100 by providing the internal temperatures T_INTs and the external temperature TEXT to an artificial neural network trained according to training data including a plurality of combinations of the internal temperatures T_INTs and the external temperature TEXT and a plurality of surface temperatures, similarly as described above with reference to FIG. 5C.

Figure 7:
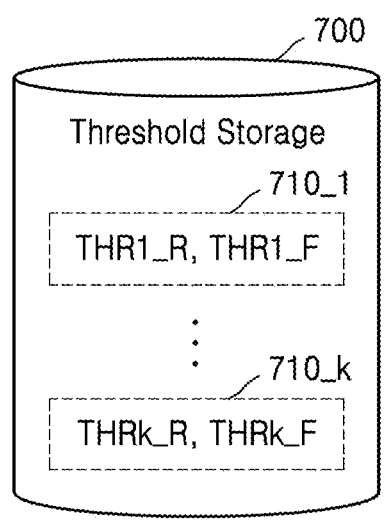
FIG. 7 is a block diagram of an example of a threshold storage according to an example embodiment of the inventive concepts.
Figure 8:
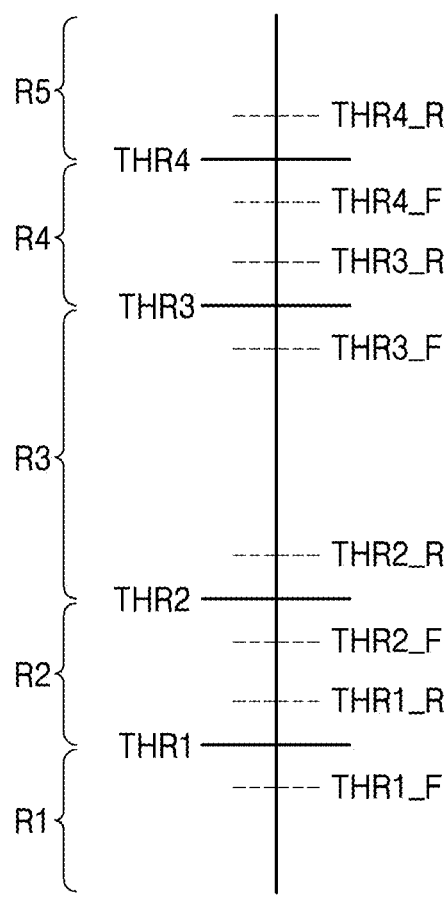
FIG. 8 is a diagram illustrating a plurality of thresholds according to an example embodiment of the inventive concepts.

FIG. 7 is a block diagram of an example of a threshold storage according to an example embodiment of the inventive concepts, and FIG. 8 is a diagram illustrating a plurality of thresholds according to an example embodiment of the inventive concepts. Specifically, the block diagram of FIG. 7 illustrates a threshold storage 700 that stores a plurality of thresholds for hysteresis of temperature range change, and the diagram of FIG. 8 illustrates the sizes of the plurality of thresholds stored in the threshold storage 700 of FIG. 7.

Referring to FIG. 7, the threshold storage 700 may store first to k-th pairs of thresholds 710_1 to 710_k (where k is an integer greater than 1), and a pair of thresholds may include a threshold compared to a rising surface temperature and a threshold compared to a falling surface temperature. As described above with reference to the drawings, the estimated surface temperature may be compared with a plurality of thresholds to determine a temperature range that includes the surface temperature, and in some example embodiments, in order to prevent the occurrence of frequent changes in a thermal mitigation operation corresponding to the temperature range, the threshold storage 700 may store thresholds for hysteresis. For example, the threshold storage 700 may store first to k-th rising thresholds THR1_R, . . . , and THRk_R compared to a rising surface temperature and first to k-th falling thresholds THR1_F, . . . , and THRk_F compared to a falling surface temperature.

Referring to FIG. 8, first to fifth temperature ranges R1 to R5 may be defined by first to fourth thresholds THR1 to THR4. Furthermore, in some example embodiments, the first to fourth thresholds THR1 to THR4 may be used to determine a state transition in a state machine, as described below with reference to FIG. 16.

The first temperature range R1 may be defined as less than the first threshold THR1, and when the surface temperature is within the first temperature range R1, the thermal mitigation operation may not be performed. In some example embodiments, when the surface temperature is high, for example, when the surface temperature is in the fifth temperature range R5, the thermal mitigation operation may be performed until the surface temperature is within the first temperature range R1. As shown in FIG. 8, the first rising threshold THR1_R and the first falling threshold THR1_F may provide hysteresis in transition between the first temperature range R1 and the second temperature range R2. The second temperature range R2 may be defined between the first threshold THR1 and the second threshold THR2, and similar to the first temperature range R1, the thermal mitigation operation may not be performed when the surface temperature is within the second temperature range R2. For example, in the first temperature range R1 and the second temperature range R2, eUTRAN New Radio-Dual Connectivity (EN-DC) may be allowed. As shown in FIG. 8, the second rising threshold THR2_R and the second falling threshold THR2_F may provide hysteresis in transition between the second temperature range R2 and the third temperature range R3. As described below with reference to FIG. 16, the first temperature range R1 and the second temperature range R2 may correspond to a safe state S10 in a state machine SM.

The third temperature range R3 may be defined between the second threshold THR2 and the third threshold THR3, and the thermal mitigation operation is not triggered if the surface temperature stays temporarily within the third temperature range R3. On the other hand, when the surface temperature is kept long in the third temperature range R3, the thermal mitigation operation may be started. As shown in FIG. 8, the third rising threshold THR3_R and the third falling threshold THR3_F may provide hysteresis in transition between the third temperature range R3 and the fourth temperature range R4. As described below with reference to FIG. 16, the third temperature range R3 may correspond to a warning state S20 in the state machine SM.

The fourth temperature range R4 may be defined between the third threshold THR3 and the fourth threshold THR4, and an immediate thermal mitigation operation may be required in the fourth temperature range R4. As shown in FIG. 8, the fourth rising threshold THR4_R and the fourth falling threshold THR4_F may provide hysteresis in transition between the fourth temperature range R4 and the fifth temperature range R5. As described below with reference to FIG. 16, the fourth temperature range R4 may correspond to an overheating state S30 in the state machine SM.

The fifth temperature range R5 may be defined as above the fourth threshold THR4, and the surface temperature may not be allowed to be in the fifth temperature range R5. When the surface temperature enters the fifth temperature range R5 due to an unspecified cause, all available thermal mitigation operations to reduce the surface temperature may be performed.

Figure 9:
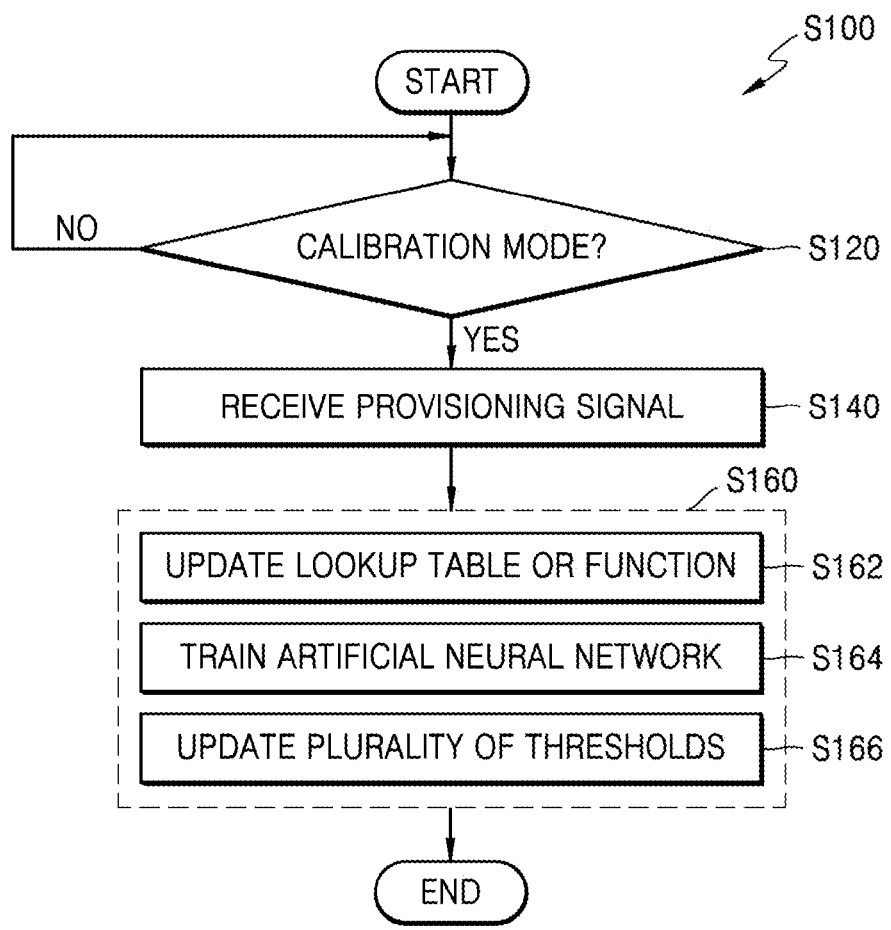
FIG. 9 is a flowchart illustrating a method for thermal mitigation according to an example embodiment of the inventive concepts.

FIG. 9 is a flowchart illustrating a method for thermal mitigation, according to an example embodiment of the inventive concepts. Specifically, in operation S100 of FIG. 9, an operation of updating information that is a basis for estimating surface temperature or determining a temperature range in which the surface temperature is included may be performed. As shown in FIG. 9, operation S100 may include operation S120, operation S140, and operation S160, and in some example embodiments, operation S100 of FIG. 9 may be performed before operation S200 of FIG. 2 is performed. In some example embodiments, operation S100 of FIG. 9 may be performed by the signal processor 150 of FIG. 1, and FIG. 9 will now be described with reference to FIG. 1.

In operation S120, an operation of determining whether the signal processor 150 is in a calibration mode may be performed. The calibration mode may be contrasted with a normal mode in which the signal processor 150 performs an operation for performing wireless communication. In some example embodiments, the calibration mode may be set in a process of manufacturing the signal processor 150 or the user equipment 100. As shown in FIG. 9, when entering the calibration mode, operation S140 may be subsequently performed.

In operation S140, an operation of receiving a provisioning signal may be performed. The provisioning signal may refer to a signal provided from the outside of the signal processor 150 to update information that is a basis for estimating surface temperature or determining a temperature range in which the surface temperature is included. In some example embodiments, the signal processor 150 may directly receive the provisioning signal. In some example embodiments, the signal processor 150 may receive the provisioning signal from the main processor 170.

In operation S160, an operation of updating information that is a basis for estimating the surface temperature or determining a temperature range in which the surface temperature is included may be performed. As shown in FIG. 9, operation S160 may include operation S162, operation S164, and operation S166. In some example embodiments, operation S160 may include only some of operations S162, S164, and S166, differently from that shown in FIG. 9.

In operation S162, an operation of updating a lookup table or a function may be performed. For example, as described above with reference to FIGS. 5A and 5B, the surface temperature may be estimated based on a predefined function and/or lookup table, and in operation S162, the function and/or lookup table may be updated according to the provisioning signal. In operation S164, an operation of training an artificial neural network may be performed. For example, as described above with reference to FIG. 5C, the surface temperature may be estimated based on the artificial neural network, and the artificial neural network may be trained, in operation S164, according to training data included in the provisioning signal. In operation S166, an operation of updating a plurality of thresholds may be performed. For example, the plurality of thresholds may be stored in the threshold storage 154 according to the provisioning signal.

Figure 10:
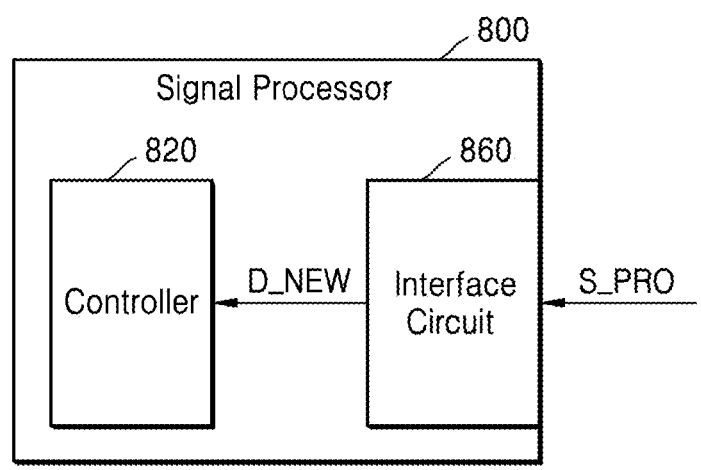
FIG. 10 is a block diagram of an example of a signal processor according to an example embodiment of the inventive concepts.

FIG. 10 is a block diagram of an example of a signal processor according to an example embodiment of the inventive concepts. Specifically, the block diagram of FIG. 10 illustrates a signal processor 800 performing the method of FIG. 9. As described above with reference to FIG. 9, the signal processor 800 may receive a provisioning signal S_PRO from the outside in a calibration mode and may update, based on the provisioning signal S_PRO, information that is a basis for estimating surface temperature or determining a temperature range in which the surface temperature is included. As shown in FIG. 10, the signal processor 800 may include a controller 820 and an interface circuit 860. Hereinafter, descriptions that are the same as those of FIG. 1 from among descriptions of FIG. 10 will be omitted.

The interface circuit 860 may receive the provisioning signal S_PRO and may generate new data D_NEW from the provisioning signal S_PRO and provide the new data D_NEW to the controller 820. The new data D_NEW may include information that is a basis for estimating surface temperature or determining a temperature range in which the surface temperature is included, and the controller 820 may update the information based on the new data D_NEW. For example, the controller 820 may update a function having internal temperatures and/or external temperature as arguments, as described above with reference to FIG. 5A, may update a lookup table, as described above with reference to FIG. 5B, and may train an artificial neural network or program the artificial neural network with data defining a trained artificial neural network. In addition, the controller 820 may store a plurality of thresholds in a threshold storage (e.g., the threshold storage 154 of FIG. 1).

In some example embodiments, the interface circuit 860 may be activated in a calibration mode and may be disabled in other modes, i.e., a normal mode. Also, in some example embodiments, differently from that shown in FIG. 10, instead of providing the new data D_NEW to the controller 820, the interface circuit 860 may access a predefined function, a lookup table, an artificial neural network, a threshold storage, and the like and may directly update the information that is a basis for estimating surface temperature or determining a temperature range in which the surface temperature is included.

Figure 11:
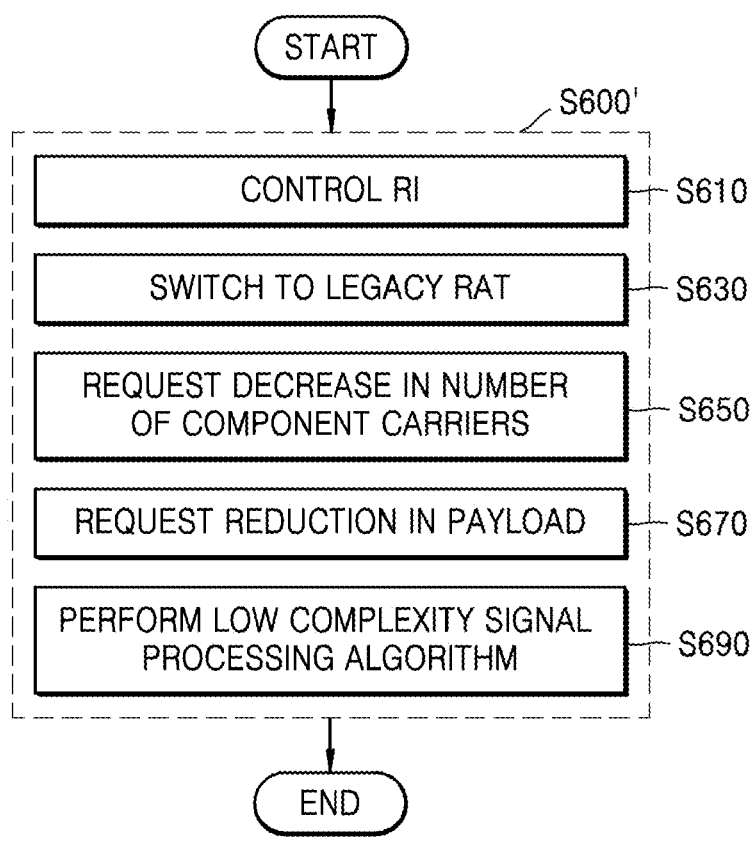
FIG. 11 is a flowchart illustrating a method for thermal management according to an example embodiment of the inventive concepts.

FIG. 11 is a flowchart illustrating a method for thermal management, according to an example embodiment of the inventive concepts. Specifically, the flowchart of FIG. 11 illustrates an example of operation S600 of FIG. 2, and as described above with reference to FIG. 2, a thermal mitigation operation may be selectively performed in operation S600' of FIG. 11. As shown in FIG. 11, operation S600' may include a plurality of operations S610, S630, S650, S670, and S690, and one or more of the plurality of operations S610, S630, S650, S670, and S690 may be performed simultaneously. In some example embodiments, operation S600' may be performed by the controller 152 of FIG. 1, and FIG. 11 will now be described with reference to FIG. 1.

In operation S610, an operation of controlling a rank indicator or rank index (RI) may be performed. For example, the user equipment 100 and the base station 200 may communicate through MIMO, and the RI may refer to the number of spatially separated layers. When the number of ranks is reduced, since signals may be processed with lower computational power, the controller 152 may perform a thermal mitigation operation by controlling the RI. An example of operation S610 will be described below with reference to FIG. 12.

In operation S630, an operation of switching to legacy radio access technology (RAT) may be performed. For example, the user equipment 100 may support two or more RATs, such as 5G NR and LTE, and may also support multi-connectivity (MC) to simultaneously access two or more different RATs. For example, the user equipment 100 may support dual-connectivity (DC) to simultaneously access two different RATs. New RATs (e.g. 5G NR) as opposed to legacy RATs (e.g. LTE) may require relatively high signal processing capability for high data throughput, and thus, the controller 152 may cease wireless communication through the new RATs and perform a thermal mitigation operation by allowing wireless communication through the legacy RATs. In some example embodiments, the legacy RAT may refer to a RAT that uses a relatively low frequency band and/or a relatively narrow bandwidth.

In operation S650, an operation of requesting a decrease in the number of component carriers may be performed. For example, the user equipment 100 and the base station 200 may wirelessly communicate through carrier aggregation, and as the number of component carriers used for carrier aggregation increases, higher signal processing capability may be required. Accordingly, the controller 152 may request a counterpart wireless communication device, that is, the base station 200, to reduce the number of component carriers used for carrier aggregation.

In operation S670, an operation of requesting a reduction in payload may be performed. For example, the controller 152 may request the main processor 170 to reduce a payload, i.e., a transmit payload TX_PL, to reduce signal processing required for transmission via wireless communication, i.e., transmission via uplink. In response to the request of the controller 152, examples of an operation of reducing the transmit payload TX_PL performed by the main processor 170 will be described below with reference to FIG. 14.

In operation S690, a low complexity signal processing algorithm may be performed. For example, the signal processor 150 may process a signal based on a selected one of a variety of signal processing algorithms, and the controller 152 may perform a thermal mitigation operation by allowing a relatively low complexity signal processing algorithm to be performed, instead of a high complexity signal processing algorithm of high performance. An example of operation S690 will be described below with reference to FIG. 15.

Figure 12:
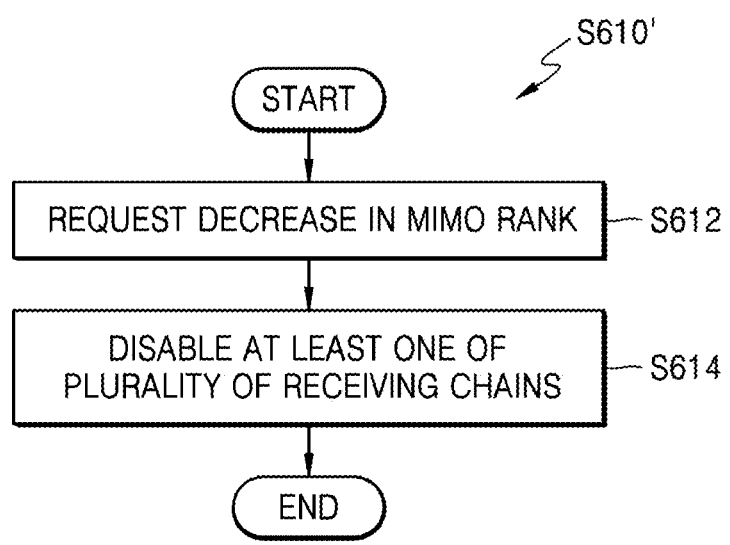
FIG. 12 is a flowchart illustrating a method for thermal management according to an example embodiment of the inventive concepts.
Figure 13:
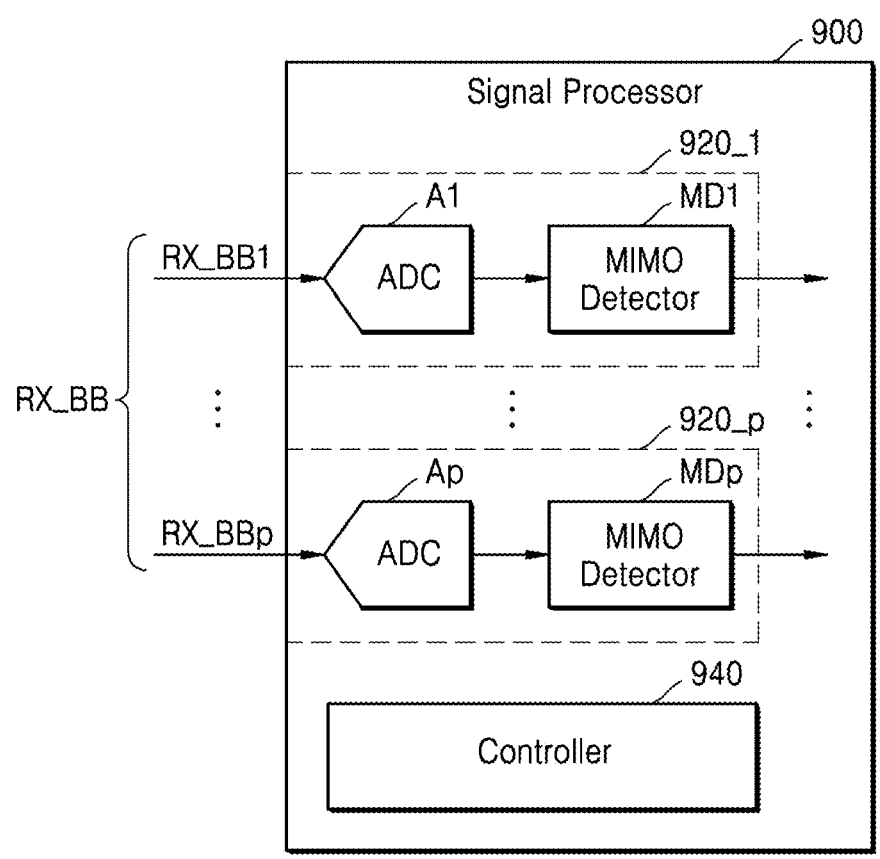
FIG. 13 is a block diagram of a signal processor according to an example embodiment of the inventive concepts.

FIG. 12 is a flowchart illustrating a method for thermal management, according to an example embodiment of the inventive concepts, and FIG. 13 is a block diagram of a signal processor according to an example embodiment of the inventive concepts. Specifically, the flowchart of FIG. 12 shows an example of operation S610 of FIG. 11, and the block diagram of FIG. 13 shows a signal processor 900 performing operation S610' of FIG. 12. As described above with reference to FIG. 11, a thermal mitigation operation may be performed by controlling the RI in operation S610' of FIG. 12.

Referring to FIG. 13, the signal processor 900 may include first to p-th receiving chains 920_1 to 920_p and a controller 940 (where p is an integer greater than 1). Each of the receiving chains may independently process a receive baseband signal provided from a transceiver (e.g. the transceiver 130 of FIG. 1). For example, as shown in FIG. 13, the first receiving chain 920_1 may receive a first receive baseband signal RX_BB1 and may include an analog-to-digital converter A1 for processing the first receive baseband signal RX_BB1 and an MIMO detector MD1. Similarly, the p-th receiving chain 920_p may include an analog-to-digital converter Ap for processing the p-th receive baseband signal RX_BBp and an MIMO detector MDp. The number of receiving chains used for reception may depend on an MIMO rank.

Referring back to FIG. 12, operation S610' may include operation S612 and operation S614. In operation S612, an operation of requesting a decrease in the MIMO rank may be performed. For example, the controller 940 may request a counterpart wireless communication device (e.g., the base station 200 of FIG. 1) to decrease the MIMO rank. In some example embodiments, the controller 940 may directly request a decrease in the MIMO rank and may also provide information that causes the counterpart wireless communication device to decrease the MIMO rank. For example, the controller 940 may provide information indicating a low quality of channel.

In operation S614, an operation of disabling at least one of a plurality of receiving chains may be performed. For example, the controller 940 may disable at least one of the first to p-th receiving chains 920_1 to 920_p when the MIMO rank decreases according to the request of operation S612. Accordingly, power consumption and heat generation of the signal processor 900 may be reduced.

Figure 14:
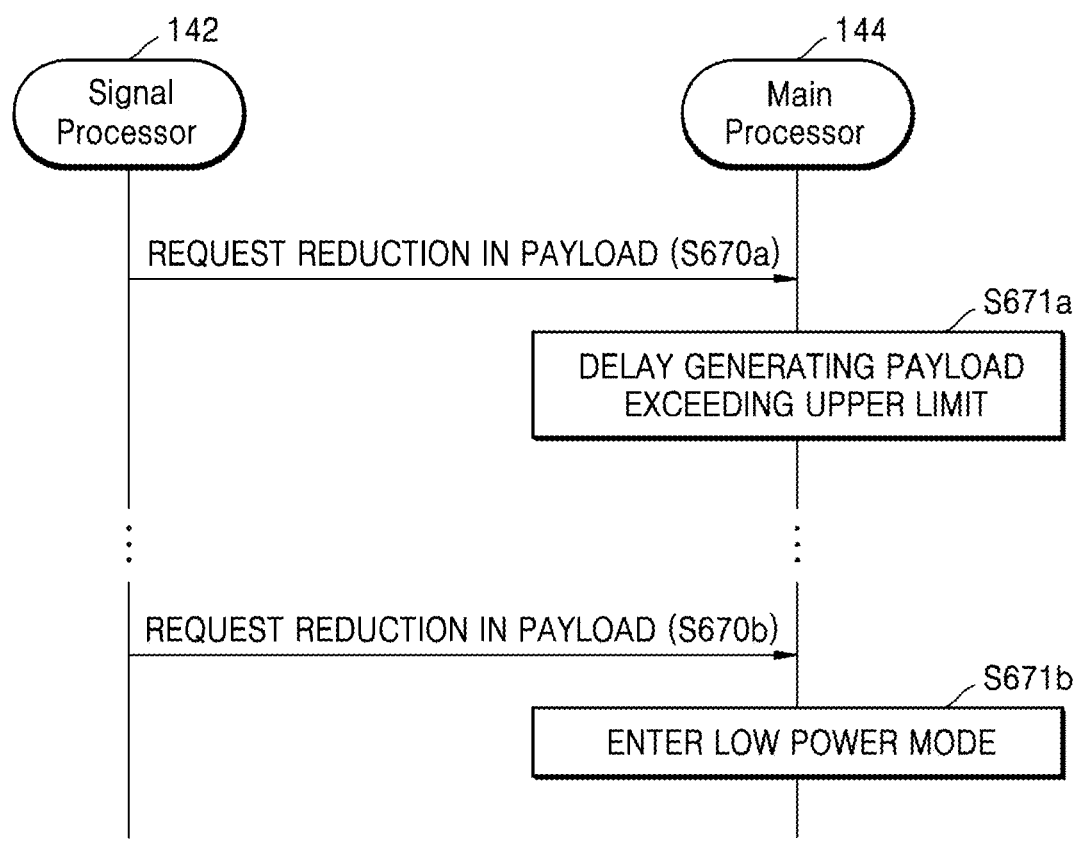
FIG. 14 is a flowchart illustrating a method for thermal management according to an example embodiment of the inventive concepts.

FIG. 14 is a flowchart illustrating a method for thermal management, according to an example embodiment of the inventive concepts. Specifically, the flowchart of FIG. 14 shows examples of operation S670 of FIG. 11 performed by the signal processor 142 and examples of operation of the main processor 144, and as described above with reference to FIG. 11, the signal processor 142 may request the main processor 144 to reduce the payload.

Referring to FIG. 14, in operation S670a, the signal processor 142 may request the main processor 144 to reduce the payload. In some example embodiments, the signal processor 142 may provide a request to main processor 144 by IPC. Then, in operation S671a, the main processor 144 may delay generating a payload exceeding an upper limit. For example, the main processor 144 may delay execution of at least one of a plurality of applications generating a payload.

In operation S670b, the signal processor 142 may request the main processor 144 to reduce the payload. Then, in operation S671b, the main processor 144 may enter a low power mode. For example, the payload reduction request from the signal processor 142 may be due to an increase in the surface temperature of a wireless communication device (e.g., the user equipment 100 in FIG. 1) that includes the signal processor 142 and the main processor 144. In this case, the main processor 144 may enter a low power mode to reduce the surface temperature of the wireless communication device, and may trigger operations corresponding to the low power mode.

Figure 15:
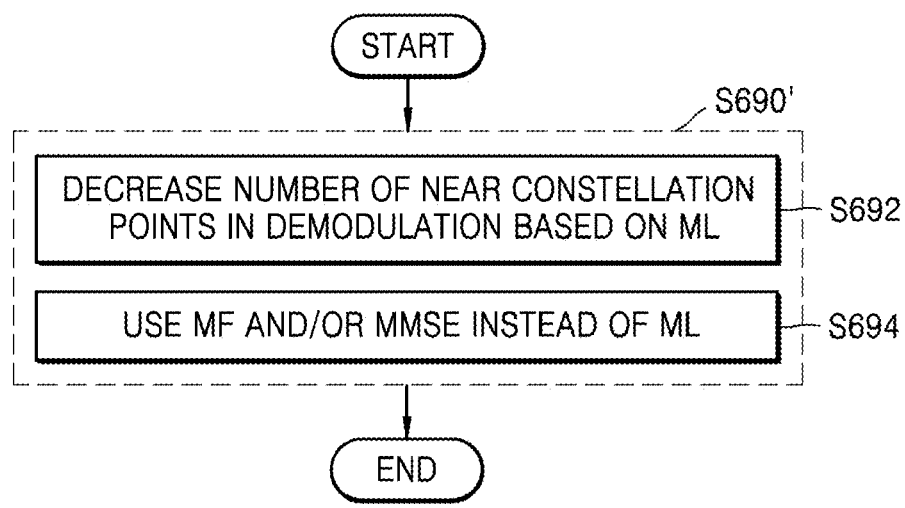
FIG. 15 is a flowchart illustrating a method for thermal management according to an example embodiment of the inventive concepts.

FIG. 15 is a flowchart illustrating a method for thermal management, according to an example embodiment of the inventive concepts. Specifically, the flowchart of FIG. 15 illustrates an example of operation S690 of FIG. 11, and as described above with reference to FIG. 11, a low complexity signal processing algorithm may be performed in operation S690' of FIG. 15. As shown in FIG. 15, operation S690' may include operation S692 and operation S694. In some example embodiments, differently from that shown in FIG. 15, operation S690' may include only one of operations S692 and S694. In some example embodiments, operation S690' may be performed by the signal processor 150 of FIG. 1, and FIG. 15 will now be described with reference to FIG. 1.

In operation S692, an operation of decreasing the number of near constellation points in demodulation based on maximum likelihood (ML) may be performed. For example, the signal processor 150 may include an MIMO detector operating based on an ML algorithm, and the controller 152 may reduce power consumption and heat generation of the MIMO detector by controlling the MIMO detector to reduce the number of candidate constellation points that are near to a measured metric on a constellation diagram. For example, the signal processor 150 may sort candidate constellation points, which are near to the measured metric, in the order of nearest proximity, and may select the half of candidate constellation points used before.

In operation S694, an operation of using a matched filter (MF) and/or a minimum mean squared error (MMSE) instead of the ML may be performed. For example, the signal processor 150 may include an MIMO detector that operates based on an algorithm selected from the ML, the MF, and the MMSE, and the controller 152 may reduce power consumption and heat generation of the MIMO detector by controlling the MIMO detector such that the MF and/or MMSE having lower complexity than the ML are used.

Figure 16:
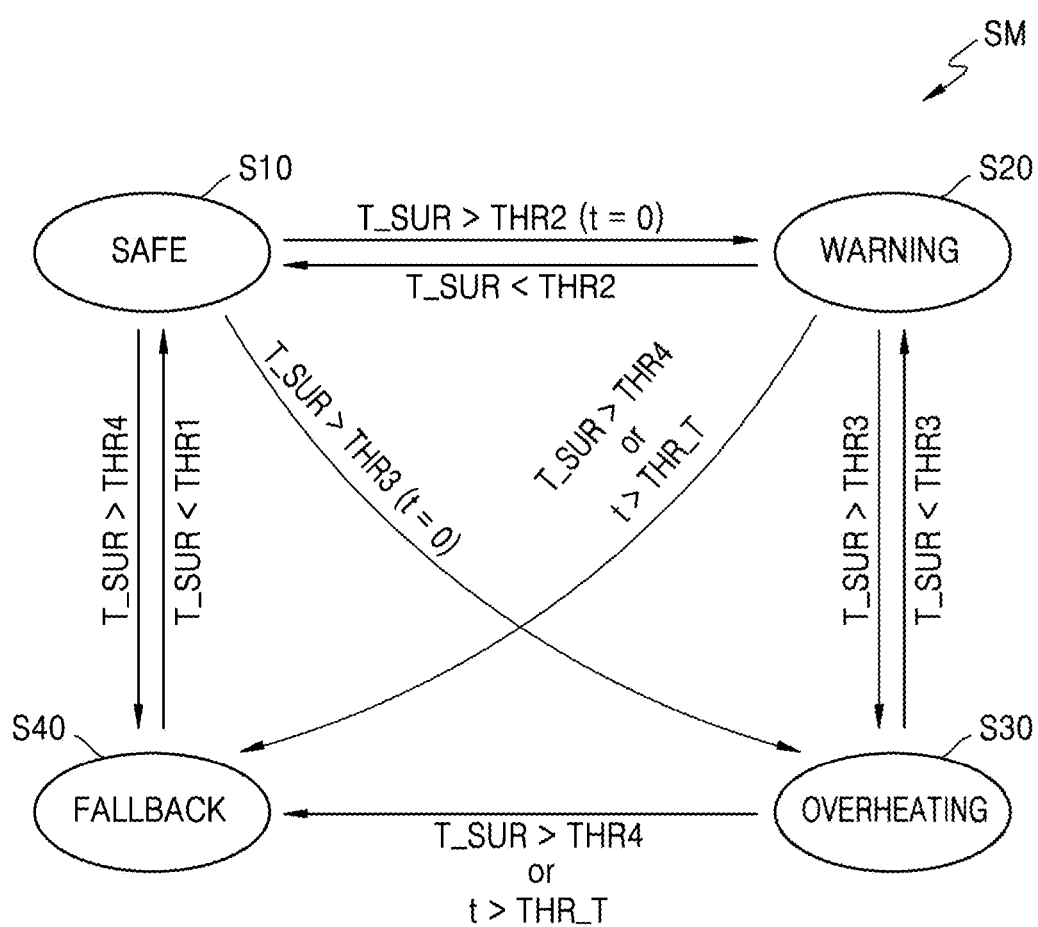
FIG. 16 illustrates a state machine performing a method for thermal management according to an example embodiment of the inventive concepts.

FIG. 16 illustrates a state machine SM performing a method for thermal management, according to an example embodiment of the inventive concepts. As shown in FIG. 16, the state machine SM may include four states, that is, a safe state S10, a warning state S20, an overheating state S30, and a fallback state S40, and a state transition between the four states may occur based on an estimated surface temperature T_SUR and first to fourth thresholds THR1 to THR4. In some example embodiments, the state machine SM may be implemented in the controller 152 of FIG. 1, and the first to fourth thresholds THR1 to THR4 of FIG. 16 may correspond to the first to fourth thresholds of FIG. 8. As described above with reference to FIG. 8, hysteresis may be provided in a comparison between the surface temperature T_SUR and the first to fourth thresholds THR1 to THR4.

In the safe state S10 (which may be referred to as a first state), wireless communication may be performed without limitation on operations, due to a surface temperature T_SUR that is low. For example, EN-DC may be allowed and the use of all ranks provided by the signal processor 150 may be allowed. However, as shown in FIG. 16, when the surface temperature T_SUR is higher than the second threshold THR2 (T_SUR>THR2), a transition to the warning state S20 may occur. In addition, when the surface temperature T_SUR is higher than the third threshold THR3 in the safe state S10 (T_SUR>THR3), a transition to the overheating state S30 may occur. As shown in FIG. 16, when a transition from the safe state S10 to the warning state S20 or the overheating state S30 occurs, a time "t" indicating a continuous stay time in the warning state S20 or the overheating state S30 may be reset (t=0). When the surface temperature T_SUR is higher than the fourth threshold THR4 in the safe state S10 (T_SUR>THR4), a transition to the fallback state S40 may occur.

In the warning state S20 (which may be referred to as a second state), wireless communication may be temporarily performed without limitation on operations. However, as shown in FIG. 16, when the continuous stay time in the warning state S20 or the overheating state S30 exceeds a threshold THR_T (t>THR_T), a transition to the fallback state S40 may occur. In addition, when the surface temperature T_SUR is higher than the third threshold THR3 in the warning state S20 (T_SUR>THR3), a transition to the overheating state S30 may occur. On the other hand, when the surface temperature T_SUR is lower than the second threshold THR2 in the warning state S20 (T_SUR<THR2), a transition to the safe state S10 may occur.

In the overheating state S30 (which may be referred to as a third state), some thermal mitigation operation may be performed. For example, while EN-DC may be temporarily allowed, available ranks may be reduced and a low complexity signal processing algorithm may be used. As shown in FIG. 16, when the surface temperature T_SUR is higher than the fourth threshold THR4 in the overheating state S30 or the continuous stay time in the warning state S20 or the overheating state S30 exceeds the threshold THR_T (t>THR_T), a transition to the fallback state S40 may occur. On the other hand, when the surface temperature T_SUR is lower than the third threshold THR3 in the overheating state S30, a transition to the warning state S20 may occur.

In the fallback state S40 (which may be referred to as a fourth state), the most efficient thermal mitigation operation may be performed. For example, EN-DC may not be allowed, and switching to legacy RAT (e.g., LTE) may occur. In some example embodiments, the use of all ranks according to the legacy RAT in the fallback state S40 may be allowed. As shown in FIG. 16, when the surface temperature T_SUR is lower than the first threshold THR1, a transition to the safe state S10 may occur.

Figure 17:
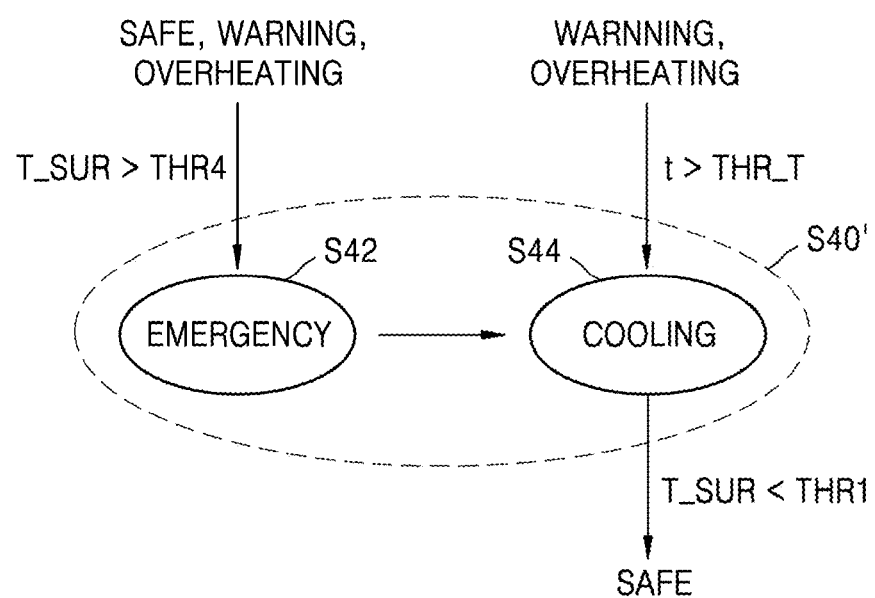
FIG. 17 illustrates a state machine performing a method for thermal management according to an example embodiment of the inventive concepts.

FIG. 17 illustrates a state machine performing a method for thermal management according to an example embodiment of the inventive concepts. Specifically, FIG. 17 illustrates an example of the fallback state S40 of FIG. 16, and as shown in FIG. 17, a fallback state S40' may include an emergency state S42 and a cooling state S44.

Referring to FIG. 17, when an estimated surface temperature T_SUR is higher than the fourth threshold THR4, a state transition to the emergency state S42 may immediately occur. For example, when the surface temperature T_SUR is higher than the fourth threshold THR4 in the safe state S10, the warning state S20, and the overheating state S30 of FIG. 16 (T_SUR>THR4), a transition to the emergency state S42 may occur. In the emergency state S42, switching to the legacy RAT may be immediately performed. For example, wireless communication over 5G NR may be stopped, and radio communication over LTE may occur or be maintained. Then, as shown in FIG. 17, a transition from the emergency state S42 to the cooling state S44 may occur.

Even if the estimated surface temperature T_SUR is not higher than the fourth threshold THR4, when a time for which the surface temperature T_SUR that is relatively high is maintained is long, a transition to the cooling state S44 may occur. For example, when the continuous stay time in the warning state S20 or the overheating state S30 of FIG. 16 exceeds the threshold (t>THR_T), a transition to the cooling state S44 may occur. In the cooling state S44, switching to legacy RAT may occur and EN-DC may not be allowed, while all ranks according to the legacy RAT may be used. As shown in FIG. 17, when the surface temperature T_SUR is lower than the first threshold THR1 in the cooling state S44, a transition to the safe state S10 may occur.

Figure 18:
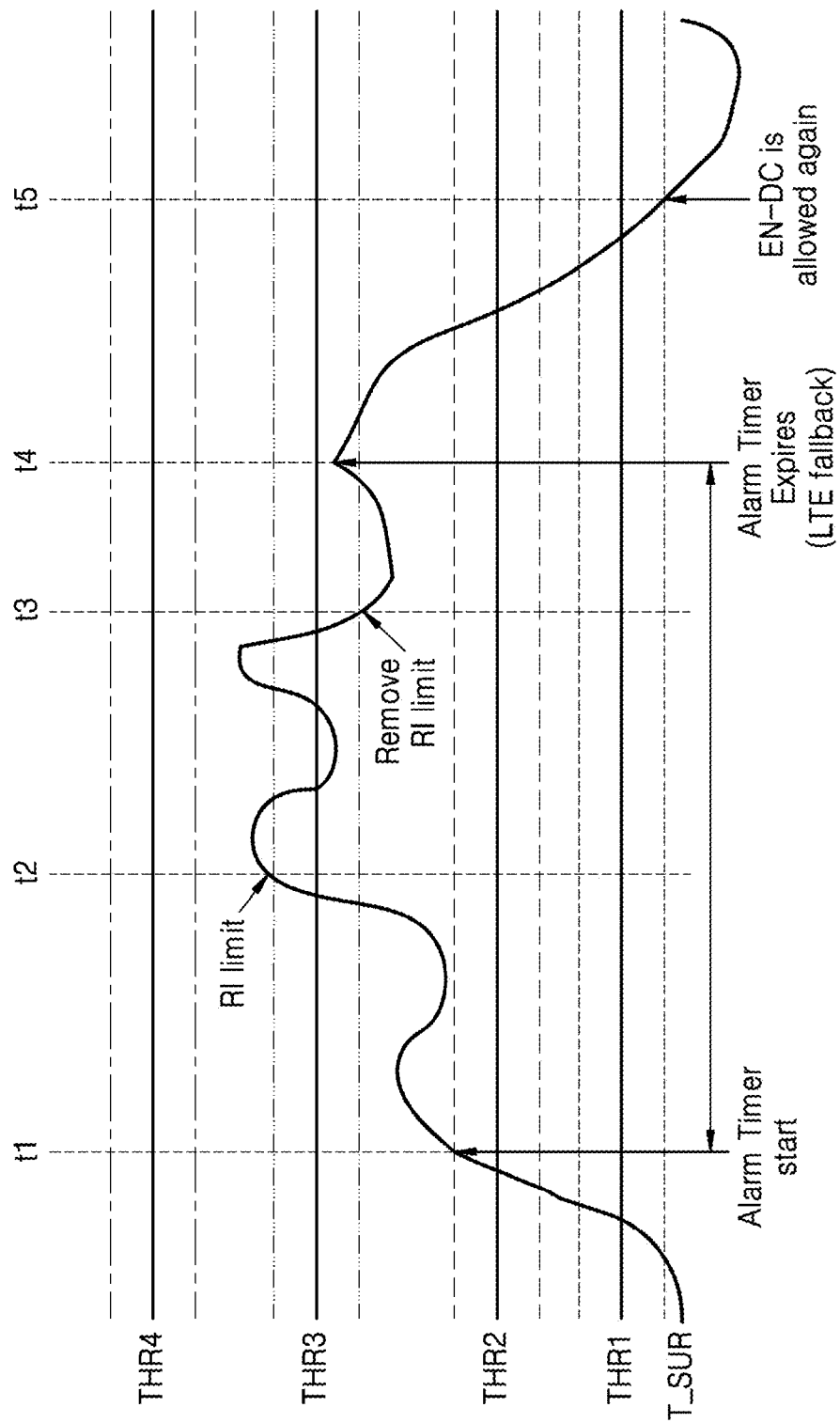
FIG. 18 is a graph illustrating a change in surface temperature over time, according to a thermal management method according to an example embodiment of the inventive concepts.

FIG. 18 is a graph illustrating a change in the surface temperature T_SUR over time, according to a thermal management method according to an example embodiment of the inventive concepts. In detail, the surface temperature T_SUR may be compared with the first to fourth thresholds THR1 to THR4. Hysteresis may be applied as indicated by dotted lines in FIG. 18. However, hereinafter, for convenience of description, FIG. 18 will be described as the surface temperature T_SUR being higher or lower than the first to fourth thresholds THR1 to THR4 and will be described with reference to the state machine SM of FIG. 16.

At time t1, the surface temperature T_SUR may be higher than the second threshold THR2. Accordingly, a transition from the safe state S10 to the warning state S20 may occur. In addition, an alarm timer may be started to measure the continuous stay time in the warning state S20 or the overheating state S30.

At time t2, the surface temperature T_SUR may be higher than the third threshold THR3. Accordingly, a transition from the warning state S20 to the overheating state S30 may occur, and the MIMO rank may be limited. In addition, a low complexity signal processing algorithm may be performed and the alarm timer started at time t1 may continue to operate. As shown in FIG. 18, events occur where the surface temperature is lower or higher than the third threshold THR3 from time t2 to time t3, but the occurrence of a state transition may be prevented due to hysteresis (defined by the third rising threshold THR3_R and the third falling threshold THR3_F in FIG. 8).

At time t3, the surface temperature T_SUR may be lower than the third threshold THR3. Accordingly, a transition from the overheating state S30 to the warning state S20 may occur, and the limitation on the MIMO rank may be removed. In addition, a high complexity signal processing algorithm may be performed and the alarm timer started at time t1 may continue to operate.

At time t4, the alarm timer may expire. Accordingly, a transition from the warning state S20 to the fallback state S40 may occur, and a transition to the legacy RAT such as LTE may occur. Also, while the EN-DC may not be allowed, all ranks according to the legacy RAT may be allowed.

At time t5, the surface temperature T_SUR may be lower than the first threshold THR1. Accordingly, a transition from the fallback state S40 to the safe state S10 may occur and the EN-DC may be allowed, that is, wireless communication may be performed without limitations on the operation.

The various operations of methods described above may be performed by any suitable means capable of performing the operations.

For example, the signal processor including the controller, encoder, decoder, modulator, filter and/or analog-to-digital converter included therein may be implemented using processing circuitry including logic circuits, a hardware/software combination such as a processor executing software; or a combination thereof. For example, the processing circuitry may include, but is not limited to, a CPU, an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc. The processing circuitry may be configured as a special purpose computer to estimate surface temperature based on sensed internal temperatures and selectively perform at least one thermal mitigation operation based on the surface temperature and plural temperature ranges defined by temperature thresholds. Therefore, the special purpose processing circuitry may improve the functioning of the signal processor and/or the user equipment including the same by predicting surface temperature and performing thermal mitigation operations customized for each of a plurality of temperature ranges, thereby achieving more efficient thermal management.

While the inventive concepts have been particularly shown and described with reference to some example embodiments thereof, it will be understood that various changes in form and details may be made therein without departing from the spirit and scope of the following claims.

What is claimed is:

1. A signal processing device configured to process a baseband signal for wireless communication, the signal processing device comprising:
 a plurality of temperature sensors configured to sense a plurality of internal temperatures of internal functional blocks of the signal processing device, respectively;
 a storage device configured to store a plurality of thresholds defining a plurality of temperature ranges, and to store a function that models surface temperature as a thermal resistance network having a plurality of resistors connected in series or parallel between the internal functional blocks of the signal processing device; and
a controller configured to,
estimate a surface temperature by reading the function from the storage device and applying the plurality of internal temperatures as input arguments to the function without directly sensing the surface temperature, and
selectively perform at least one thermal mitigation operation based on the surface temperature and the plurality of temperature ranges.

2. The signal processing device of claim 1, further comprising:
a plurality of receiving chains, each including an analog-to-digital converter and a multi-input multi-output (MIMO) detector,
wherein the controller is configured to perform the at least one thermal mitigation operation by,
requesting a counterpart wireless communication device to decrease a MIMO rank, and
disabling at least one of the plurality of receiving chains.

3. The signal processing device of claim 1, wherein the controller is configured to perform the at least one thermal mitigation operation by switching to a legacy radio access technology (RAT).

4. The signal processing device of claim 1, wherein the controller is configured to perform the at least one thermal mitigation operation by requesting a counterpart wireless communication device to reduce a number of component carriers used for carrier aggregation.

5. The signal processing device of claim 1, wherein the controller is configured to perform the at least one thermal mitigation operation by requesting a main processor reduce a payload of a wireless transmission associated with the wireless communication, the main processor being external to the signal processing device.

6. The signal processing device of claim 1, wherein the controller is configured to perform the at least one thermal mitigation operation by controlling a low complexity signal processing algorithm.

7. The signal processing device of claim 6, further comprising:
a demodulator configured to perform demodulation based on maximum likelihood (ML),
wherein the controller is configured to perform the at least one thermal mitigation operation by reducing a number of near constellation points in a constellation diagram associated with the ML.

8. The signal processing device of claim 6, further comprising:
a demodulator configured to perform demodulation based on one selected from among a maximum likelihood (ML), a matched filter (MF), and a minimum mean squared error (MMSE),
wherein the controller is configured to perform the at least one thermal mitigation operation by controlling the demodulator to perform demodulation based on only the MF or the MMSE.

9. The signal processing device of claim 1, further comprising:
a first interface circuit configured to provision the plurality of thresholds in a calibration mode.

10. The signal processing device of claim 1, further comprising:
a second interface circuit configured to provision the function in a calibration mode.

11. The signal processing device of claim 1, wherein the controller is configured to estimate the surface temperature based on an artificial neural network trained according to training data including the plurality of internal temperatures and surface temperatures.

12. A wireless communication device comprising:
a temperature sensing device configured to sense a first temperature;
a main processor configured to obtain the first temperature;
a signal processing device communicatively connected with the main processor, the signal processing device configured to,
process a baseband signal for wireless communication, and
perform a thermal management operation by,
obtaining the first temperature from the main processor,
reading, from a storage device, a function that models surface temperature as a thermal resistance network having a plurality of resistors connected in series or parallel between internal functional blocks of the signal processing device,
estimate a surface temperature of the wireless communication device by applying a plurality of second temperatures sensed internally and the first temperature as input arguments to the function without directly sensing the surface temperature of the wireless communication device, and
selectively perform a thermal mitigation operation based on the surface temperature and a plurality of temperature ranges defined by a plurality of thresholds.

13. The wireless communication device of claim 12, wherein the signal processing device is configured to selectively perform the thermal mitigation operation by transmitting a request to the main processor to reduce a payload of a wireless transmission associated with the wireless communication.

14. The wireless communication device of claim 13, wherein the main processor is configured to, in response to the request, delay generating the payload if the payload exceeds a upper limit.

15. The wireless communication device of claim 13, wherein the main processor is configured to enter a low power mode in response to the request.

16. A thermal management method performed by a signal processing device configured to process a baseband signal for wireless communication, the thermal management method comprising:
sensing a plurality of internal temperatures of the signal processing device;
reading, from a storage device, a function that models surface temperature as a thermal resistance network having a plurality of resistors connected in series or parallel between internal functional blocks of the signal processing device;
estimating a surface temperature by applying the plurality of internal temperatures as input arguments to the function without directly sensing the surface temperature;
reading, from the storage device, a plurality of thresholds defining a plurality of temperature ranges; and
performing at least one thermal mitigation operation based on the surface temperature and the plurality of temperature ranges.

17. The thermal management method of claim 16, wherein the estimating of the surface temperature includes:
   obtaining an external temperature sensed outside of the signal processing device; and
   estimating the surface temperature as the surface temperature of a wireless communication device including the signal processing device based on the plurality of internal temperatures and the external temperature.

18. The thermal management method of claim 16, wherein the signal processing device includes a plurality of receiving chains, each including an analog-to-digital converter and a multi-input multi-output (MIMO) detector,
   wherein the performing of the thermal mitigation operation includes:
      requesting a counterpart wireless communication device to decrease a MIMO rank; and
      disabling at least one of the plurality of receiving chains.

19. The thermal management method of claim 16, wherein the performing of the at least one thermal mitigation operation includes at least one of:
   switching to legacy radio access technology (RAT);
   requesting a counterpart wireless communication device to reduce a number of component carriers used for carrier aggregation; and
   requesting a main processor reduce a payload of a wireless transmission associated with the wireless communication, the main processor being external to the signal processing device.

* * * * *